United States Patent
Allard et al.

(10) Patent No.: US 8,584,486 B1
(45) Date of Patent: Nov. 19, 2013

(54) MODULAR DOOR MOUNTED CLIMATE CONTROLLED MEDICINE COMPARTMENT

(75) Inventors: Paul B. Allard, Stevensville, MI (US); Kelly I. Johnson, Portage, MI (US); Douglas D. Leclear, Benton Harbor, MI (US); Karen J. Querfurth, Coloma, MI (US); Andrew M. Tenbarge, Saint Joseph, MI (US); Michele E. Wilcox, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 565 days.

(21) Appl. No.: 12/402,731

(22) Filed: Mar. 12, 2009

Related U.S. Application Data

(60) Provisional application No. 61/035,775, filed on Mar. 12, 2008.

(51) Int. Cl.
F25D 25/00 (2006.01)

(52) U.S. Cl.
USPC .............................. 62/377; 62/457.1; 62/457.9

(58) Field of Classification Search
USPC .............. 62/377, 457.1, 457.9; 312/242, 245, 312/223.6
See application file for complete search history.

(56) References Cited

U.S. PATENT DOCUMENTS

| | | | |
|---|---|---|---|
| 3,497,281 A * | 2/1970 | Wilde | 312/223.1 |
| 3,603,657 A * | 9/1971 | Hassay | 312/404 |
| 3,754,803 A * | 8/1973 | Underwood et al. | 312/31 |
| 4,322,954 A * | 4/1982 | Sheehan et al. | 62/371 |
| 4,505,131 A * | 3/1985 | Boxall | 62/407 |
| 4,687,040 A * | 8/1987 | Ball | 160/107 |
| 4,801,182 A * | 1/1989 | Metcalfe et al. | 312/321.5 |
| 4,962,491 A * | 10/1990 | Schaeffer | 368/21 |
| 5,661,978 A * | 9/1997 | Holmes et al. | 62/3.6 |
| 6,085,542 A | 7/2000 | Johnson et al. | |
| 6,148,624 A | 11/2000 | Bishop et al. | |
| 6,253,570 B1 * | 7/2001 | Lustig | 62/457.2 |
| 6,464,506 B1 | 10/2002 | Welles | |
| D474,485 S | 5/2003 | Eveland et al. | |
| 6,595,016 B1 * | 7/2003 | Demirkiran | 62/236 |
| 6,612,116 B2 | 9/2003 | Fu et al. | |
| 6,694,770 B2 | 2/2004 | Winders et al. | |
| 6,782,710 B2 | 8/2004 | Eveland et al. | |
| 6,857,541 B1 | 2/2005 | Crisp, III | |
| 7,000,407 B2 | 2/2006 | Miozza et al. | |
| 7,188,479 B2 | 3/2007 | Anselmino et al. | |
| 7,762,102 B2 | 7/2010 | Hamel et al. | |
| 7,775,065 B2 | 8/2010 | Ouseph et al. | |
| 7,832,227 B2 | 11/2010 | Wu et al. | |
| 7,921,668 B2 | 4/2011 | Lee et al. | |
| 7,942,017 B2 | 5/2011 | Lee et al. | |
| 7,980,088 B2 | 7/2011 | LeClear et al. | |
| 8,037,706 B2 | 10/2011 | Görz et al. | |
| 2002/0104318 A1 * | 8/2002 | Jaafar et al. | 62/3.6 |

(Continued)

Primary Examiner — Marc Norman
Assistant Examiner — Jonathan Bradford

(57) ABSTRACT

An appliance system includes at least an appliance and a module. The appliance door(s) have an exterior surface and an interior surface having a door liner. The appliance door is closed to create an insulated area and the interior surface of the appliance door includes a module-engaging connector. The module is typically removably engaged within the appliance door and includes an insulated compartment within the module and a compartment door as well as a lock for the compartment door. The module also includes a utility connector that engages the appliance door and operably engages the module-engaging connector of the appliance door so that the module receives at least electrical power from the appliance.

20 Claims, 12 Drawing Sheets

(56) References Cited

U.S. PATENT DOCUMENTS

| | | |
|---|---|---|
| 2004/0231339 A1 | 11/2004 | Miozza et al. |
| 2005/0107831 A1* | 5/2005 | Hill et al. ............................ 607/2 |
| 2006/0130492 A1* | 6/2006 | Park ................................. 62/3.6 |
| 2006/0191285 A1* | 8/2006 | Rand et al. ...................... 62/408 |
| 2007/0012054 A1* | 1/2007 | Schenk et al. .................. 62/208 |
| 2007/0074527 A1 | 4/2007 | Lee et al. |
| 2007/0157655 A1* | 7/2007 | Eveland et al. ................. 62/377 |
| 2007/0257773 A1* | 11/2007 | Hill et al. ..................... 340/5.73 |
| 2008/0047282 A1 | 2/2008 | Bodin et al. |
| 2009/0145138 A1* | 6/2009 | Ethier et al. ..................... 62/3.6 |
| 2010/0276442 A1 | 11/2010 | Quefurth et al. |
| 2010/0295435 A1 | 11/2010 | Kendall et al. |
| 2011/0146312 A1 | 6/2011 | Hong et al. |

\* cited by examiner

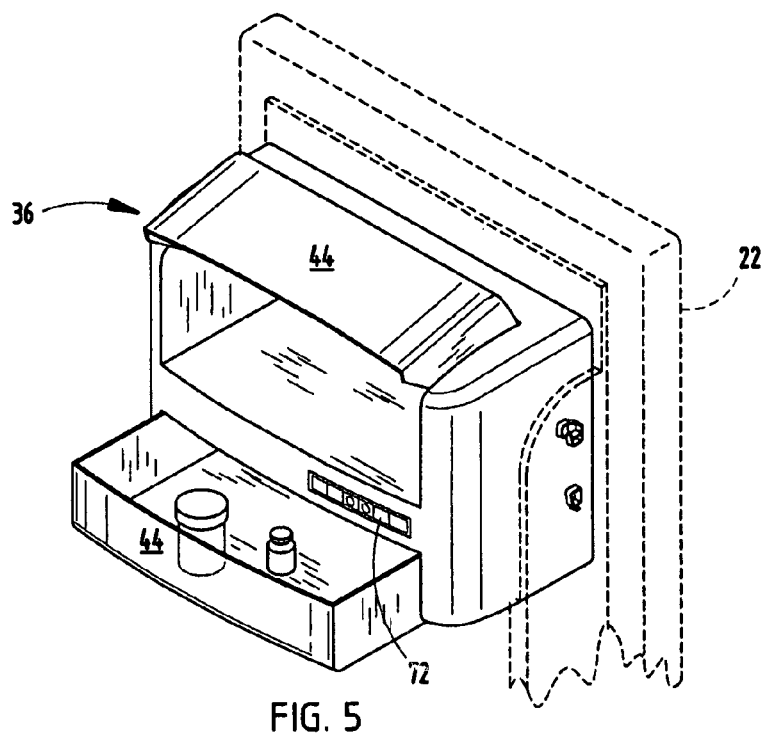
FIG. 5
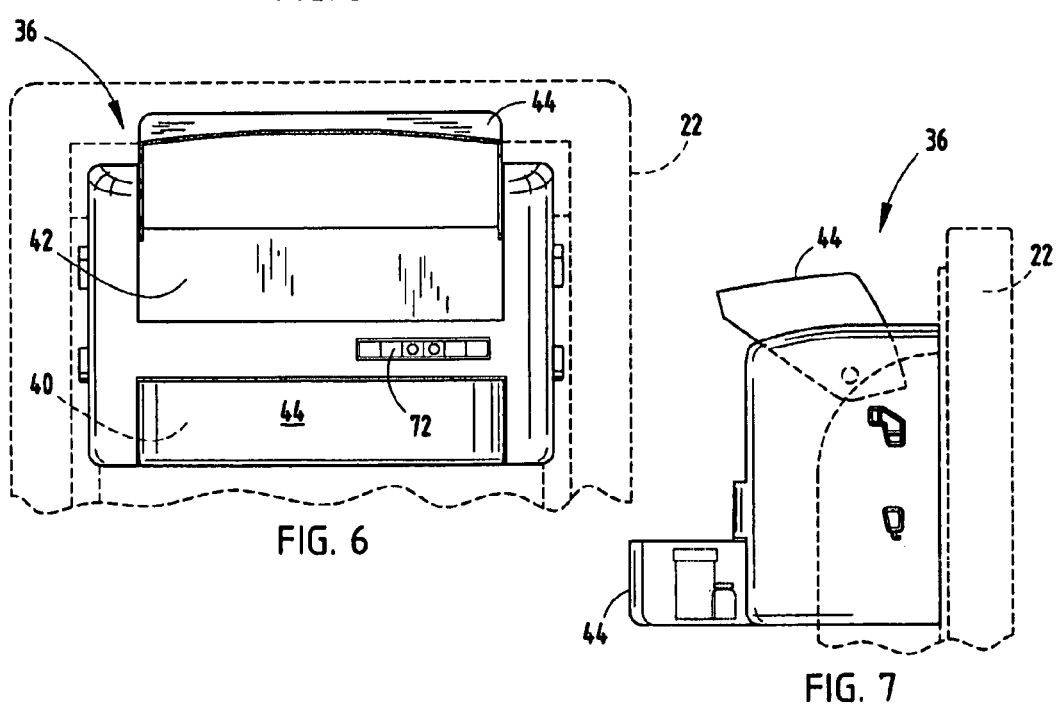
FIG. 6
FIG. 7

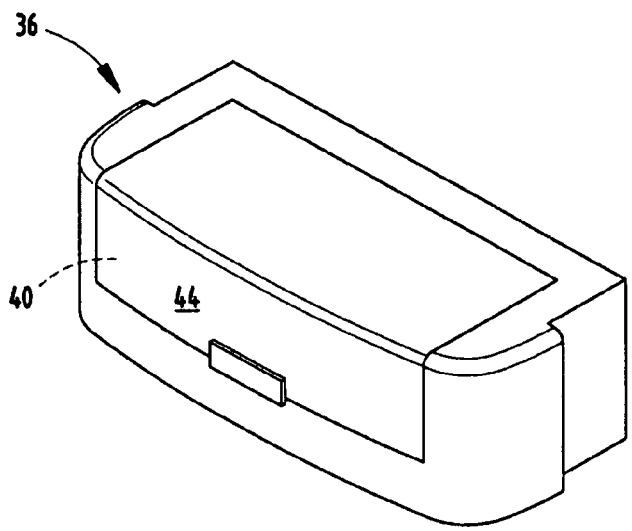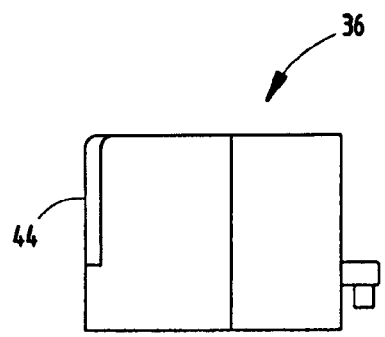
FIG. 8  FIG. 9
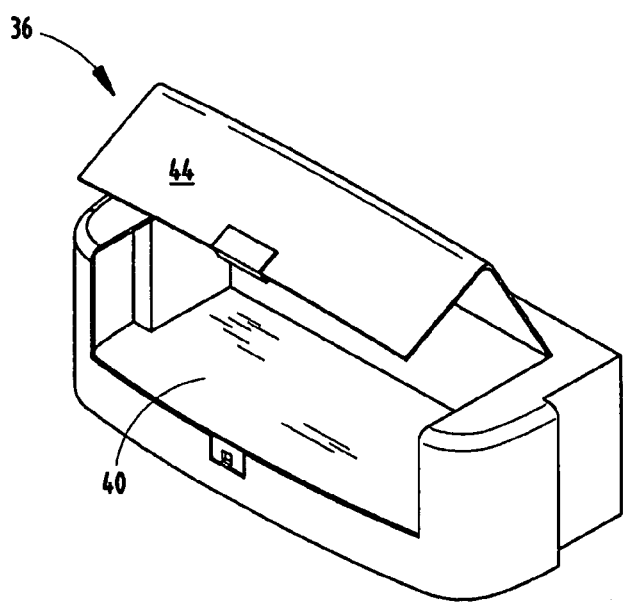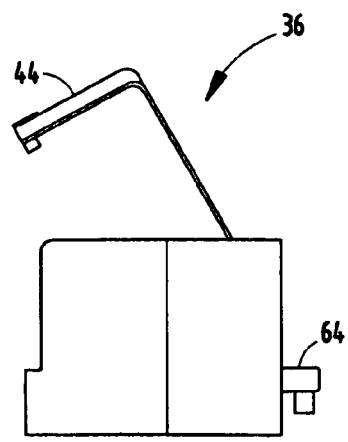
FIG. 10  FIG. 11

MODULAR DOOR MOUNTED CLIMATE CONTROLLED MEDICINE COMPARTMENT

CROSS REFERENCE TO RELATED APPLICATION

This application claims the benefit under 35 U.S.C. §119(e) of U.S. Provisional Patent Application No. 61/035,775, entitled "REFRIGERATOR WITH SPACE MANAGEMENT MODULES," filed on Mar. 12, 2008, the entire disclosure of which is hereby incorporated by reference.

BACKGROUND OF THE INVENTION

Refrigerators are available in many styles, with the most common styles including both a refrigerator compartment and a freezer compartment, which may be side-by-side or one on top of the other. Controls regulate the temperature in each compartment, but otherwise there is very little control over the precise temperature, humidity, pressure, gas composition, and other variables in each respective compartment. Thus, within each refrigerator or freezer compartment, the conditions are substantially uniform throughout the compartment.

Medications sometimes require refrigeration to maintain their effectiveness and to prevent spoilage. One option for such medication is to place the bottle in the refrigerator to provide temperature control. However, the refrigerator often is a high traffic area with access by children. Small medicine bottles may be knocked off the shelf, pushed to the back of the refrigerator compartment, or otherwise accessed by an unintended person.

SUMMARY OF THE INVENTION

One object of the present invention is to provide an appliance system with an appliance and a module. The appliance typically includes a rear wall section, a first side wall section, a second side wall section, a top and a bottom, and at least one appliance door that has an interior. A refrigerator section is typically included within the appliance interior. The refrigerator section may have the same or a smaller volume than the interior of the entire appliance. The appliance door(s) have an exterior surface and an interior surface having a door liner. The appliance door(s) is (are) closed to create an insulated area and the interior surface of the appliance door includes a module-engaging connector. The module is removably engaged within the appliance door. The module includes an insulated compartment within the module and an insulated compartment door. Further included is a (generally mechanical or electrical) lock for the compartment door as well as a utility connector that engages the refrigerator door and operably engages the module-engaging connector of the appliance door, so that the module receives at least electrical power from the appliance.

Another object of the present invention is to provide a portable medicine storage module. The module includes a rear wall section, the first side wall section, a second side wall section, a top, and a bottom, defining an interior. Further included is a compartment, typically an insulated compartment within the module interior. Yet further included is an insulated compartment door movable between an opened and closed position, where an opened position provides a user accessibility to the compartment and a closed position closes the insulated compartment. The compartment door includes a lock. The module also includes a utility connector for powering the module. The utility connector is engageable to a power source, where the module is supplied at least electrical power from the power source when the utility connector and the power source are operably connected to one another. The module also includes at least one atmospheric controlling device, where the module is capable of maintaining a storage effecting condition, (i.e., humidity, temperature, pressure, gas composition, and combinations thereof, but most typically maintains humidity and temperature) within the compartment. Finally, the module typically further includes at least one or divider or a plurality of bins or dividers within the compartment for medicine organization.

A further object of the present invention includes an appliance system including an appliance and the module. The appliance includes a rear wall section, a first side wall section, a second side wall section, a top, a bottom, and at least one appliance door, that has an interior. The appliance also includes a refrigerator section within the appliance interior that has the same or a smaller volume than the interior of the appliance. The appliance door has an exterior surface and an interior surface that has a door liner. The appliance door closes to create an insulated area. The module is removably engaged to the appliance door. The module typically includes an insulated compartment within the module and a compartment door. The compartment door preferably has a lock. The module also includes at least one atmospheric controlling device, where the module is capable of maintaining a storage effecting condition (i.e., humidity, temperature, pressure, gas composition, and combinations thereof), most typically within the compartment.

Another aspect of the present invention includes an appliance system that includes a module, typically a (lockable) module for preserving and/or protecting medical or nutritional, that is capable of being removably engaged with the interior surface of an appliance door as well as a secondary mounting component and receiving at least one utility from the appliance or secondary mounting component. The secondary mounting component is typically a wall mounted bracket that can be mounted, for example, on a home wall in any room, or housing or a countertop device that typically is a façade of the interior surface of the appliance where the module may also mount.

Additional objects, features, and advantages of the present invention will become more readily apparent from the following detailed description of the preferred embodiments when taken in conjunction with the drawings wherein like reference numerals refer to corresponding parts in the several views.

BRIEF DESCRIPTION OF THE DRAWINGS

FIG. 5 is an upper right perspective view of the first embodiment of the module with a plurality of compartment doors in an opened position;

FIG. 6 is an elevational front view of the first embodiment of the module with a plurality of compartment doors in an opened position;

FIG. 7 is an elevational side view of the first embodiment of the module with a plurality of compartment doors in an opened position;

FIG. 8 is an upper right perspective view of a second embodiment of the module;

FIG. 9 is an elevational side view of the second embodiment of the module;

FIG. 10 is an upper right perspective view of the second embodiment of the module with a compartment door in an opened position;

FIG. 11 is an elevational side view of the second embodiment of the module with the compartment door in an opened position;

DETAILED DESCRIPTION OF THE PREFERRED EMBODIMENTS

Figure 1:
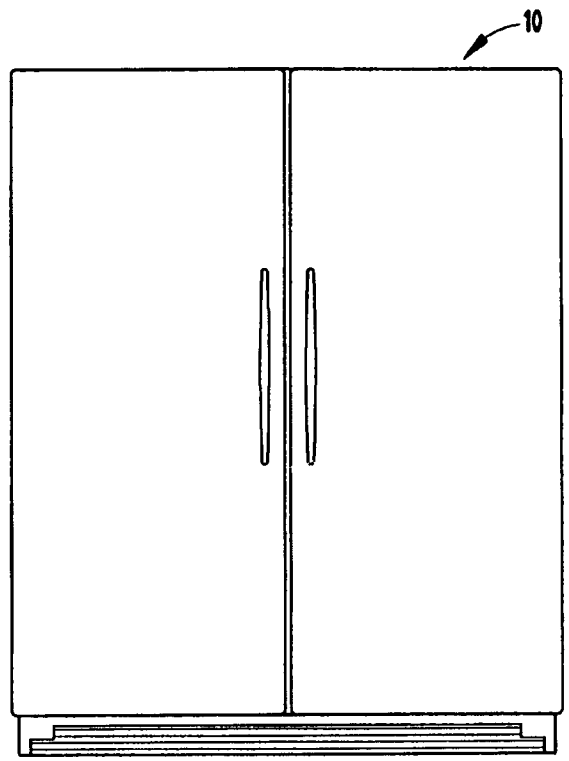
FIG. 1 is an elevational front view of an appliance with a refrigerator section.
Figure 1A:
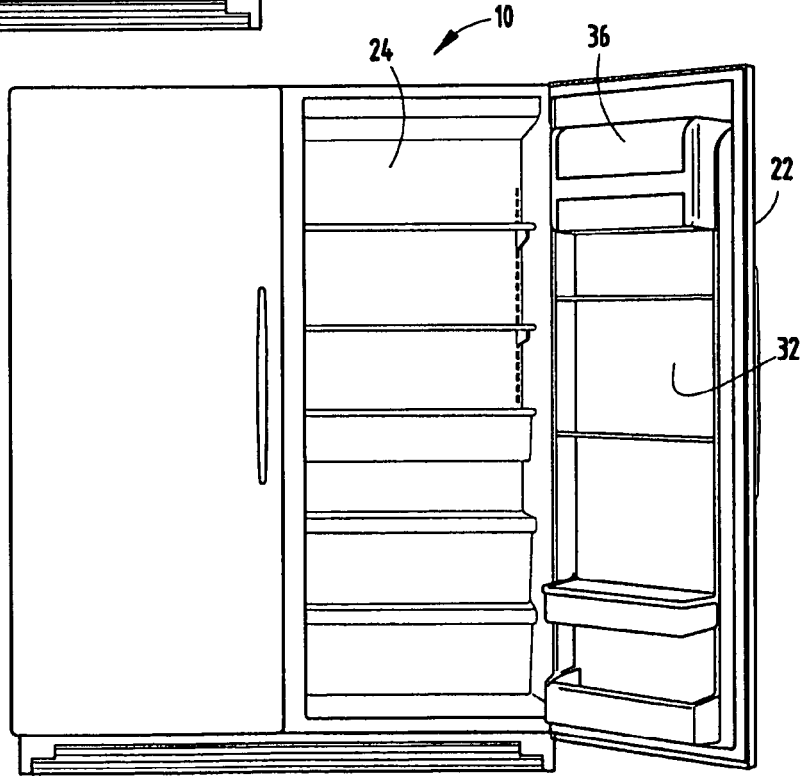
FIG. 1A is an elevational front view of the refrigerator section including a medicine storage module engaged with an appliance door.
Figure 2:
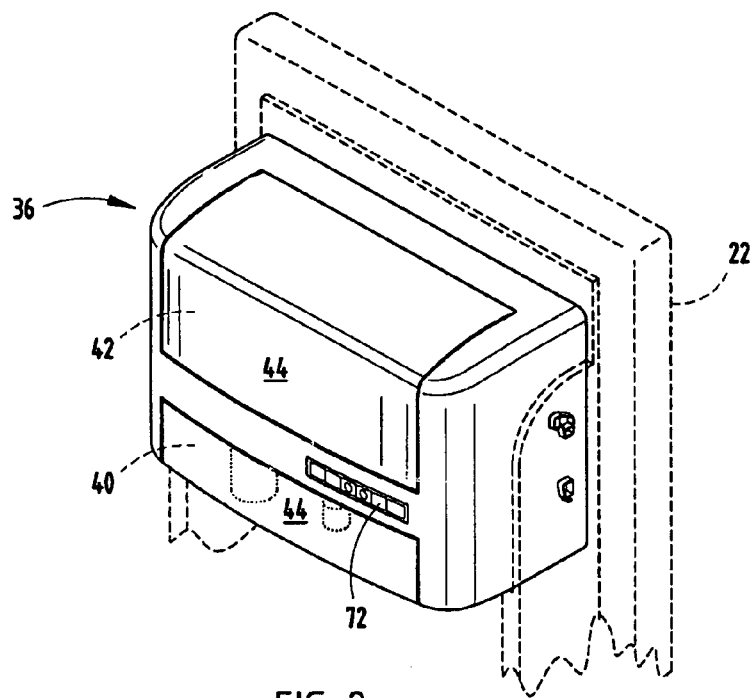
FIG. 2 is an upper right perspective view of a first embodiment of the module.
Figure 3:
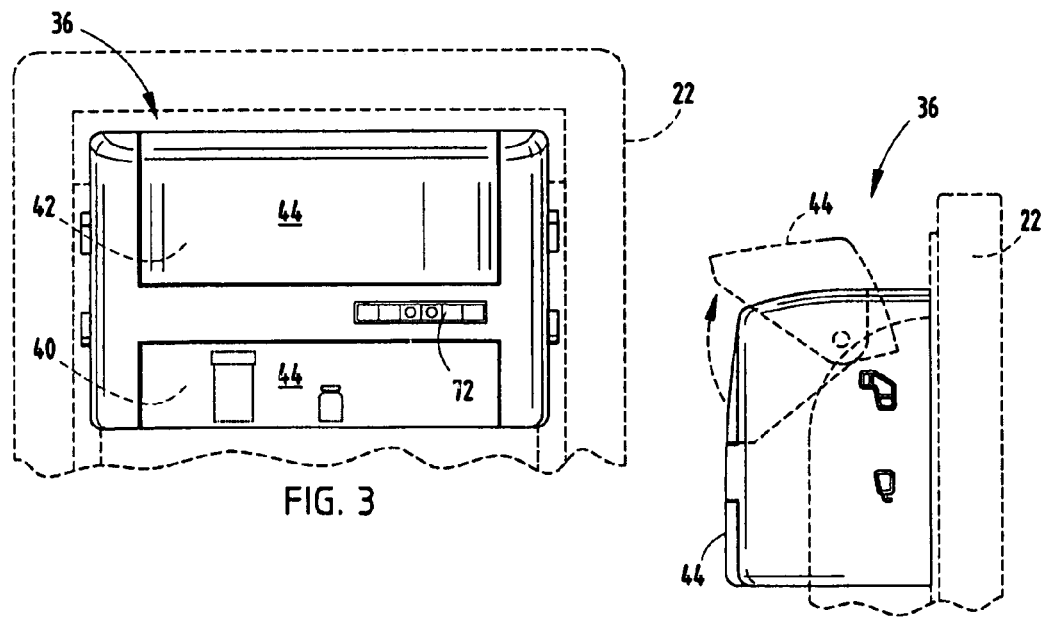
FIG. 3 is an elevational front view of the first embodiment of the module.
Figure 4:
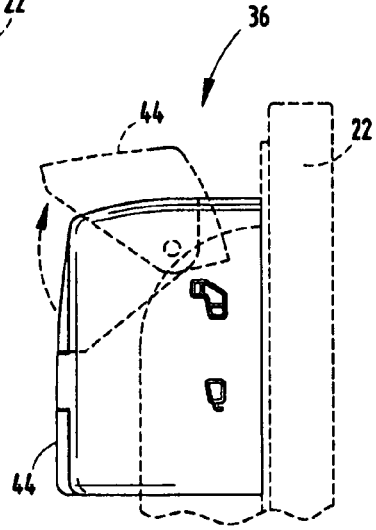
FIG. 4 is an elevational side view of the first embodiment of the module.

For purposes of description herein, the terms "upper," "lower," "right," "left," "rear," "front," "vertical," "horizontal," and derivatives thereof shall relate to the appliance as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-9) generally designates an appliance with a rear wall section 12, a first side wall section 14, a second side wall section 16, a top 18, a bottom 20, and at least one appliance door 22 providing access to the refrigerator section 24 where the rear wall section, the first side wall section, the second side wall section, the top and bottom and the appliance door define an appliance interior 26. The refrigerator section within the appliance interior may have the same or a smaller volume than the overall interior of the appliance, i.e., the appliance may be solely a refrigerator or be an appliance having both a refrigerator section and another section, such as a freezer section. The door(s) of the appliance have an exterior surface 28 and an interior surface 30 typically having a door liner 32. The liner is typically formed with a cavity or pocket 34 for receiving one or more modules with the same or different features. For example, in addition to the medicine storage module 36 of the present invention, modules that, for example, produce a modified atmosphere to preserve food such as those disclosed in commonly owned U.S. patent application Ser. Nos. 12/346,682 and 12/343,690, the disclosures of which are hereby incorporated by reference in their entireties, may also or alternatively be coupled with the appliance.

The illustrated appliance is shown with the door hingably attached to the appliance. The appliance door 22 covers at least a portion of the refrigerator section that lies within the appliance interior, and as shown, the door is in an opened position. The appliance door 22 has an exterior surface 28 and an interior surface 30, with the interior surface exposed in the opened position. The door liner at least partially covers, but more typically covers all or substantially all of the interior surface of the appliance door 22. An interface between the modules and the appliance door 22, such as interconnecting tabs and grooves or a magnetic engagement, allows for quick and easy installation docking without the use of tools. Differently sized modules may be accommodated through the use of spacer systems that engage the interior of the appliance door 22 and shorten the lateral distance that the module must traverse to engage the spacer. The spacer, when used would mimic a smaller mounting distance/door pocket or cavity and similarly have an interface such as a tabular on groove mating or magnetic engagement.

The modular construction and interchangeability of modules minimizes manufacturing costs and allows the module to be original equipment or after-market components retro-fit into appliances, after the initial purchase and installation of the appliance in a consumer's home. This interchangeability provides flexibility and improved food preservation and storage for the consumer, improved choice of modules with opportunity to upgrade or replace without replacing the whole refrigerator based upon lifestyle or life stage changes, and allows the consumer to take advantage of new technology improvements and new features as new modules are designed and developed.

A medicine storage module 36 according to one embodiment of the present invention is removably engaged with the appliance door 22 and sized to fit within the door liner typically within the cavity or pocket of the door liner. Engagement of the module 36 with the door occurs by engaging the module with the appliance door 22. The module can be engaged to the appliance door 22 in any convenient manner, such as by interlocking tabs, a small support shelf or floor, or other mechanical means or a magnetic arrangement (for example, a magnet on each side of the module for attraction to magnets of opposite polarity on each side of the door liner) may also be used. When appropriate for the module, engagement of the module to the appliance door 22 can automatically couple electrical and/or fluid lines in the door and in the module so as to provide functional features to the module. The appliance door 22 typically includes a module engaging connector 38 for providing the electrical power to the module. The door liner module engaging connector 38 may also provide one or more utilities such as fluids and chilled air to the module. Conceivably a separate utility connector could be used such that power is serviced differently from other utility or utilities. For the medicine storage module 36 of the present invention, typically only electrical power is applied to the module, however, electrical power is not mandatory and the appliance may not provide any utility to the module.

Figure 12:
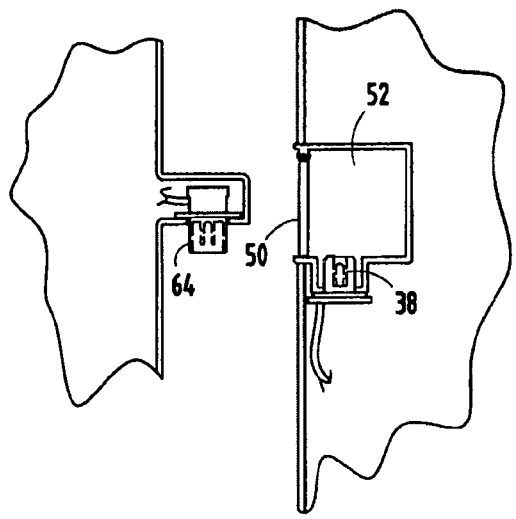
FIG. 12 is an elevational side view of the module just prior to engaging the refrigerator door.
Figure 12A:
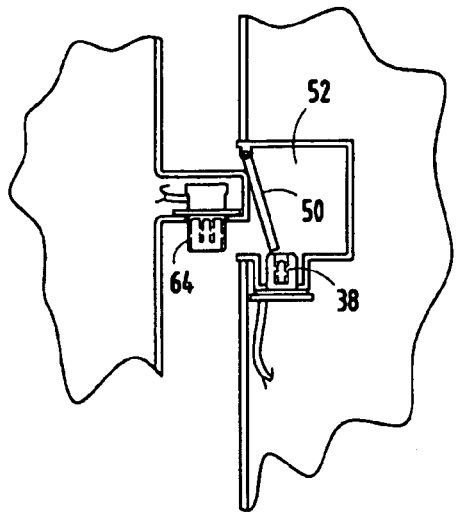
FIG. 12A is an elevational side view of module engaging the refrigerator door.
Figure 12B:
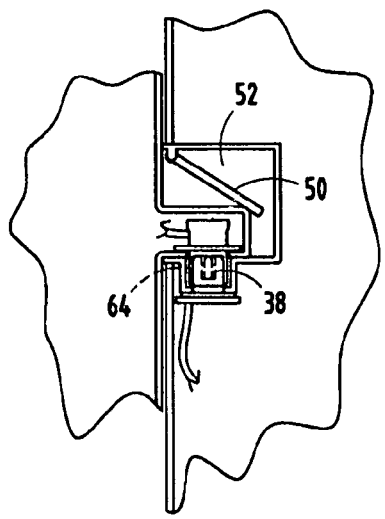
FIG. 12B is an elevational side view of module engaged with the refrigerator door.
Figure 12C:
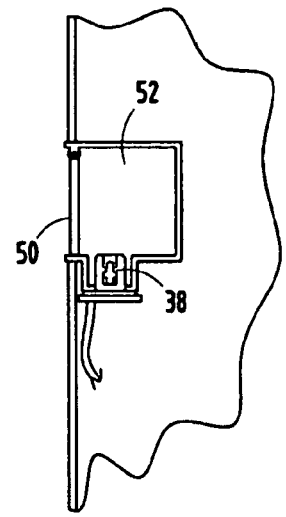
FIG. 12C is an elevational side view of a refrigerator door port area after removal of the module.
Figure 13:
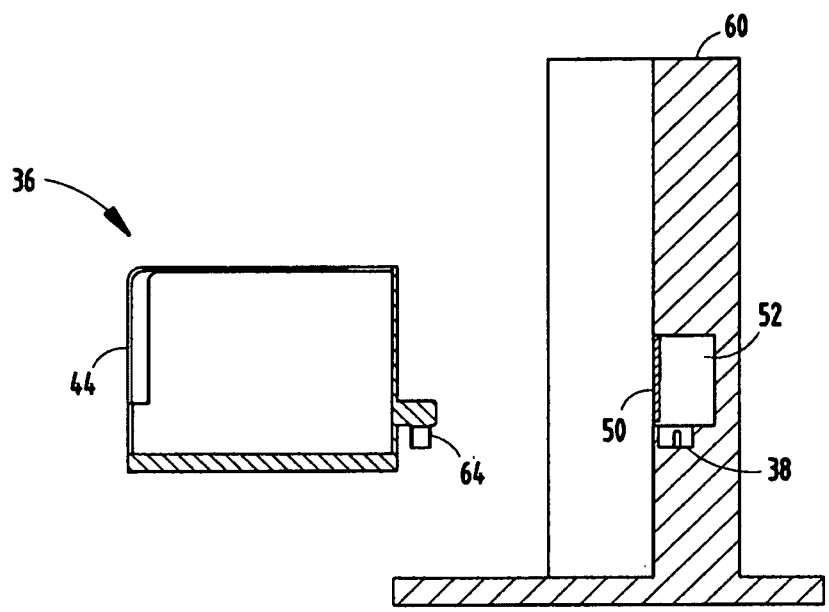
FIG. 13 is an elevational side, cross-sectional view of the module prior to engaging the countertop stand illustrating the portability of the module.
Figure 14:
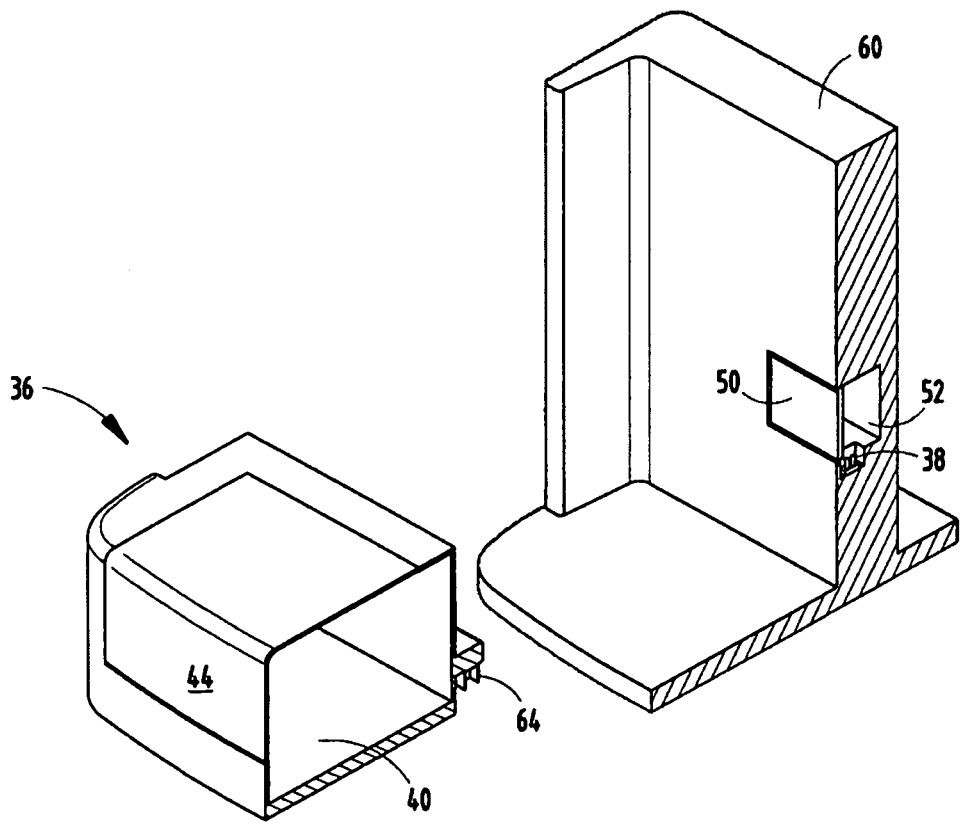
FIG. 14 is an upper right perspective, cross-sectional view of the module prior to engaging the countertop stand illustrating the portability of the module.
Figure 15:
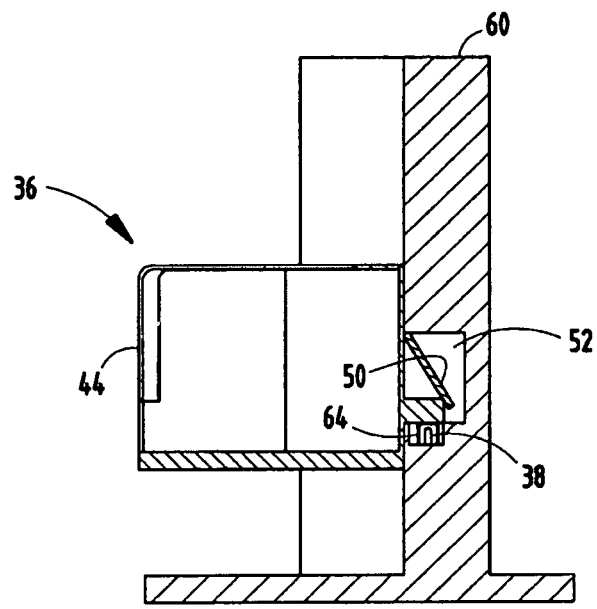
FIG. 15 is an elevational side, cross-sectional view of the module engaged to the countertop stand illustrating the portability of the module.
Figure 16:
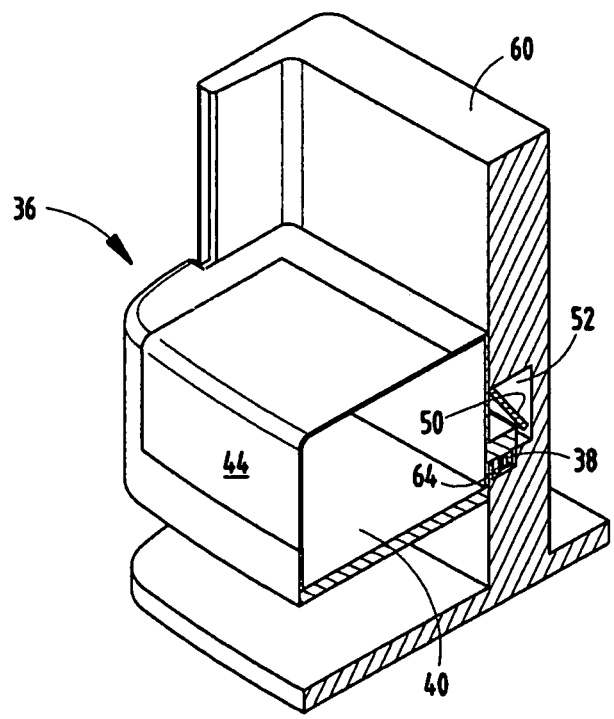
FIG. 16 is an upper right perspective, cross-sectional view of the module engaged to the countertop stand illustrating the portability of the module.
Figure 17:
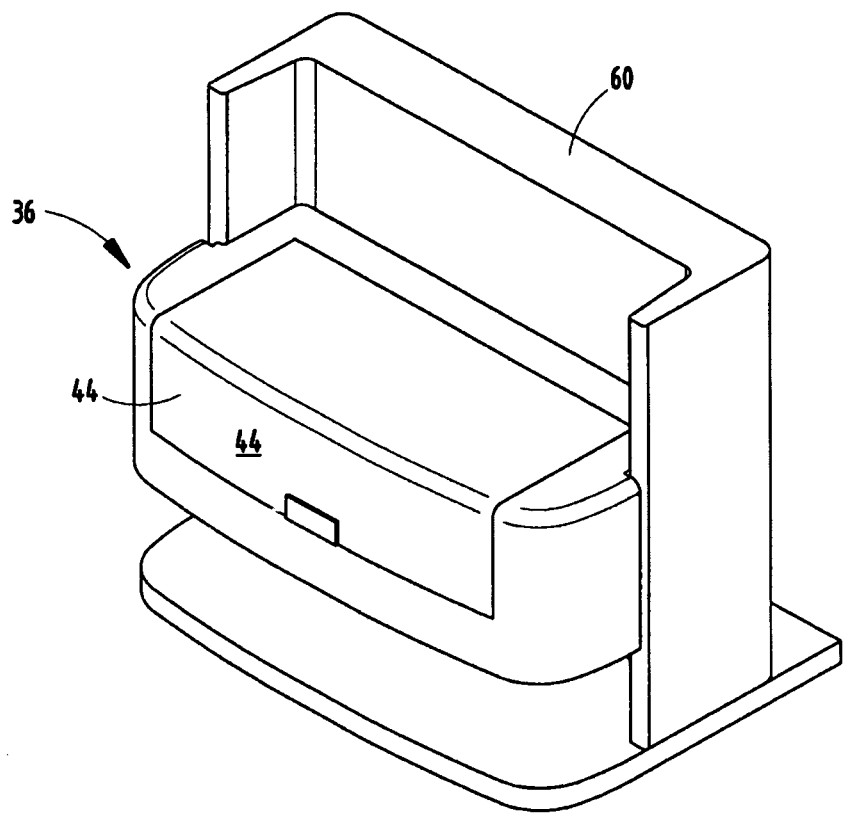
FIG. 17 is an upper right perspective view of the module engaged to the countertop stand illustrating the portability of the module.
Figure 18:
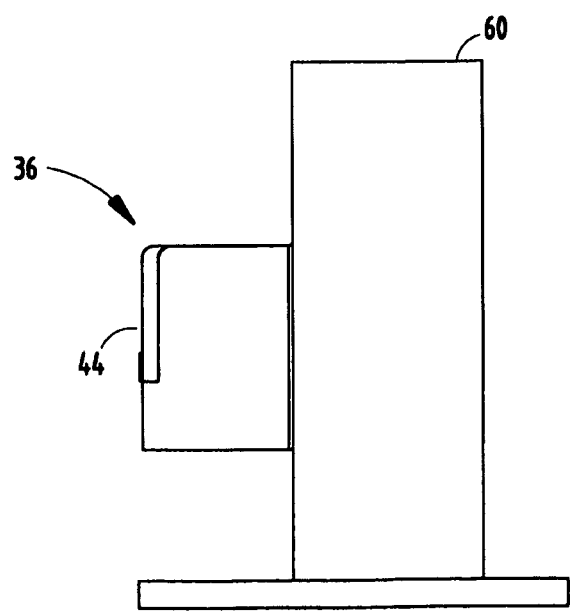
FIG. 18 is elevational side view of the module engaged to the countertop stand illustrating the portability of the module.
Figure 19:
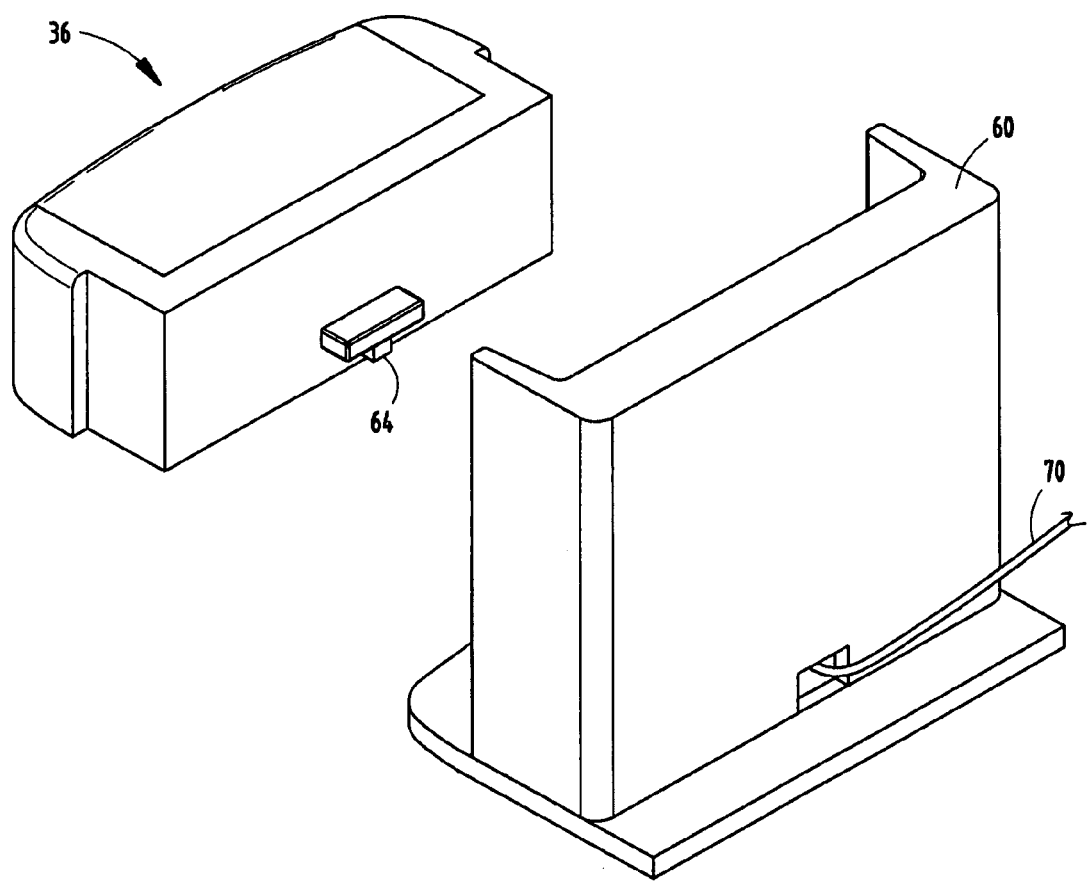
FIG. 19 is a rear perspective view of the module prior to engaging the countertop stand illustrating the portability of the module.
Figure 20:
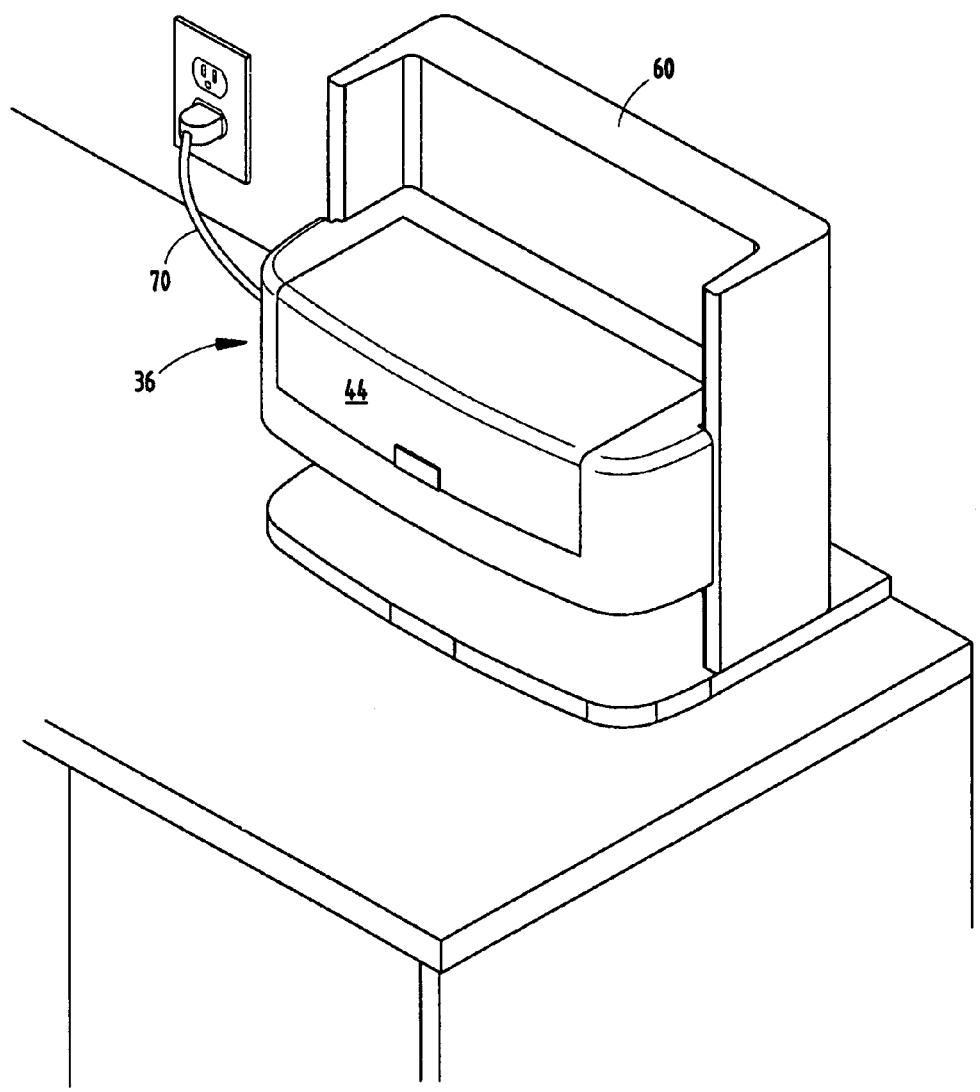
FIG. 20 is an upper right perspective, view of the module engaged to the countertop stand illustrating a powered connection to a power source.

The door liner 32 may provide the ability to engage a plurality of modules to the appliance. FIGS. 12-12C generally illustrate the engagement of a module to an appliance door 22. Typically, a spring biased connection port cover 50 is hingably engaged with the liner or appliance door 22 such that when a module is not engaged with the door the connector with the port area 52, typically a female connector in the door liner for engaging the module, is protected against debris from the food or other items stored in the appliance that would potentially block or hamper operable connection of the module. Alternatively, rather than a hinged door protecting the port area 52, a removable cover may be fastened to the liner 32. The removable cover may be fastened by screws, bolts, clipping equipment, or any other suitable fastener. The removability of the cover allows a user to store the cover while the module 36 is engaged to the door 22 and fastening of the cover to the door upon the absence of the module. In another embodiment the cover can be slidable along a track or retract to provide access to the port area. Furthermore and alternatively, the door or other mounting surface may employ the "male" connector with the connector protruding therefrom and a "female" type connector employed on the module.

While a push switch as discussed above may be used, alternative electrical engagements of the module with the appliance door 22 may be used instead of or in addition to the push switch. A Reed switch may be provided in the appliance door 22 for activation by a magnet imbedded in the side wall of the module so as to complete an electric circuit when the module docks into the door pocket. Contact pads on the appliance door 22 and on the module that complete the electrical circuit when the module is mounted in the door liner may also be employed.

In addition to being engaged with the exterior surface 28 or the interior surface 30 of the door 22 of an appliance 10, the module 36 of the present invention may optionally be engaged with a countertop stand 60 and/or a wall bracket 62. The countertop stand 60 and wall bracket 62 would typically also include a connector (typically a female connector) within a port area protected by a spring-biased port cover. The module typically draws electrical power and optionally other utilities. Conceivably, the module could also be engaged to any other surface of the appliance 10, such as a side, top, or even back portion of the appliance. Engagement to these surfaces would be accomplished in the manner previously discussed and utility may be drawn in a similar fashion. Of course, if the module would be engaged to the top of an appliance the connector of the module would typically be spaced on the bottom of the module to facilitate easy attachment of the module to the appliance. Similarly, if the module were engaged to a side of the appliance the connectors on both the appliance and the module would be on a side. Conceivably, multiple connectors on a given module may be used.

Figure 21:
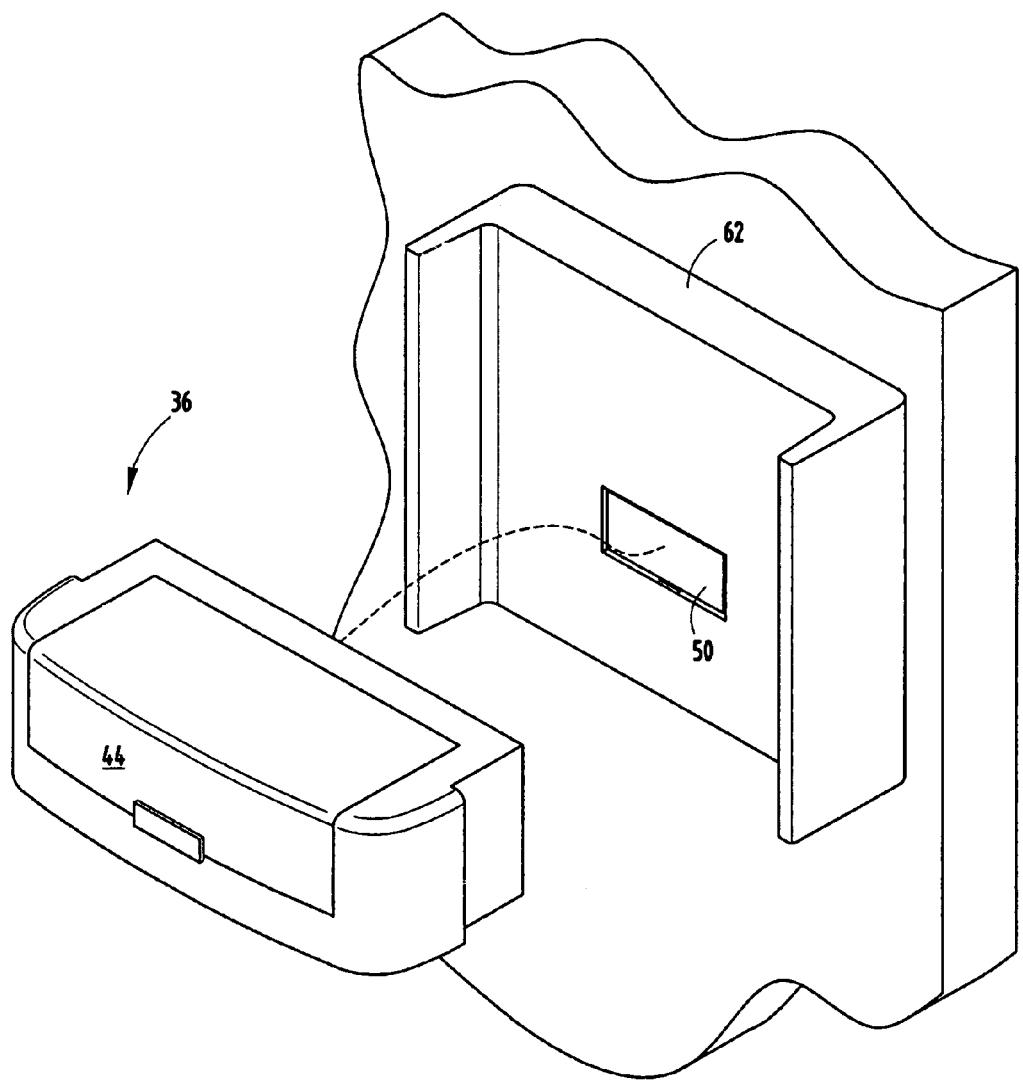
FIG. 21 is an upper right perspective view of the module prior to engaging a mounted wall bracket illustrating the portability of the module.

When a countertop stand 60 is utilized, the stand typically includes a base and an upright section that substantially mimics a pocket or cavity of a refrigerator or other appliance door liner (FIGS. 13-20). The module 36 typically engages the sides of the countertop stand 60 for retaining the module in place via interlocking tabular members, and/or a pin type arrangement or other mechanical means or magnetically as described above. Typically, as when the module engages the interior door of the appliance, the countertop stand 60 or wall bracket 62 (FIG. 21) includes a spring biased hinged cover 50 that inwardly pivots when the module's connection plug (typically male-type) is inserted therein. The cover, as discussed before, prevents debris and other materials from contacting the module engaging connector of the countertop stand and/or wall bracket. The module typically contains a generally L-shaped connection plug 64 (male-type) that is inserted into the cavity containing the module engaging connector thereby moving the cover inward about the hinge. The module is engaged with the module engaging connector 38 when the module is tilted into position and dropped into engagement with the countertop stand 60, wall bracket 62, or appliance door 22 (FIGS. 12-12C). The countertop stand itself may draw electrical power from a separate outlet or directly from the appliance via an umbilical utility cord 70 type attachment. The utility cord from the appliance could also conceivably supply cold air or liquid or other utilities to the module.

The module may come in a variety of sizes (FIGS. 2-11). Irrespective of the module size, the module typically contains at least one insulated compartment that stores the medicine. FIGS. 2-7 illustrate a larger module. As shown, the lower bin is the medicine storage compartment 40, while the upper bin 42 may house machine components to provide functionality to the module or may be employed to store other goods. Both the medicine storage compartment 40 and the upper bin 42 are accessible to a user via at least one compartment door 44 hingeably attached to the module. The storage compartment 40 may be configured so that the entire compartment slidably extends outwardly from the module. FIGS. 8-11 illustrate a smaller module version, where the storage compartment 40 comprises the entire module interior. Access to the compartment is obtained in a similar fashion as that of the larger version.

Figure 22:
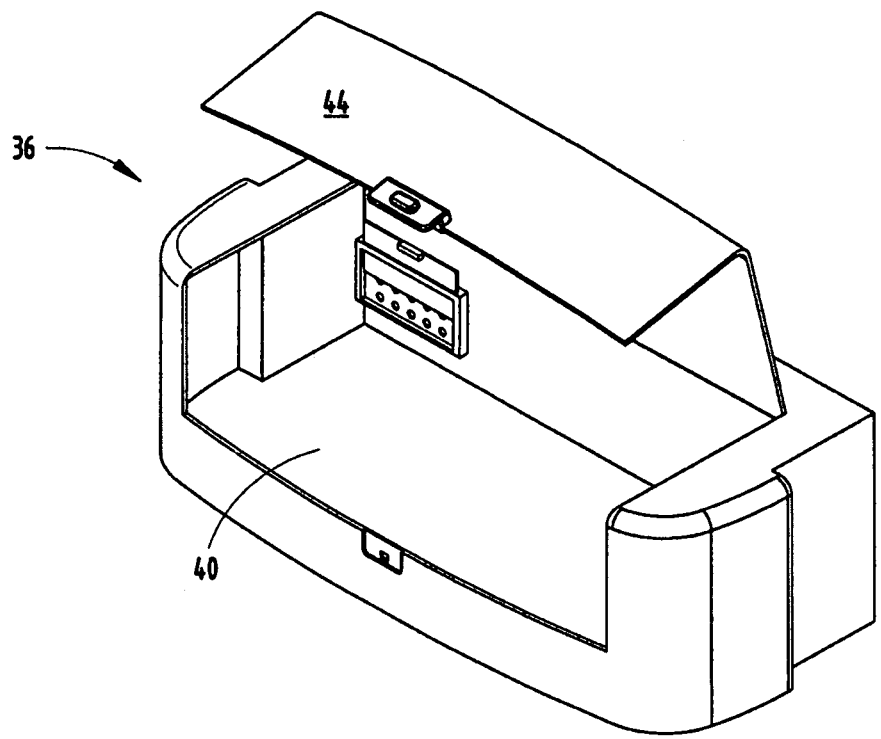
FIG. 22 is an upper right perspective view of the module with the compartment door in an opened position illustrating a compartment door lock and a humidity regulating source.

Regardless of the compartment door 44 style, a lock is available to allow a user to control access to the storage compartment 40 (FIG. 22). The compartment door 44 lock may be mechanical, where simply the turn of a key may unlock the door. Alternatively, for a powered module, the lock may be electrical, where opening of the lock may require a coded push button system. For more personalized securing of the compartment contents, access may be restricted to a single user. For example, opening of the lock may require the use of a biometric reader, such as a fingerprint sensor, voice recognition device, eye scanner, or any other biometric system. Such a restriction allows a user to restrict access to sensitive goods such as medicine, and may be employed to prevent children from accessing items such as alcohol. The module has a setting that allows the storage compartment 40 to remain unlocked, so that the lock feature may be employed at the user's discretion. This setting may be achieved via a simple mechanical push button process, or by interacting with a user interface 72 display on the exterior of the module. Associated lock feature components, whether mechanical or electrical, may be housed in the upper bin 42 area, in the case of the larger module version. As with other modules having such machine component housing areas, the upper bin 42 area is usually appropriately vented and insulated to prevent its operation from affecting the temperatures of the refrigerator section of the appliance, thereby providing energy efficiency.

Figures 22A, 22B:
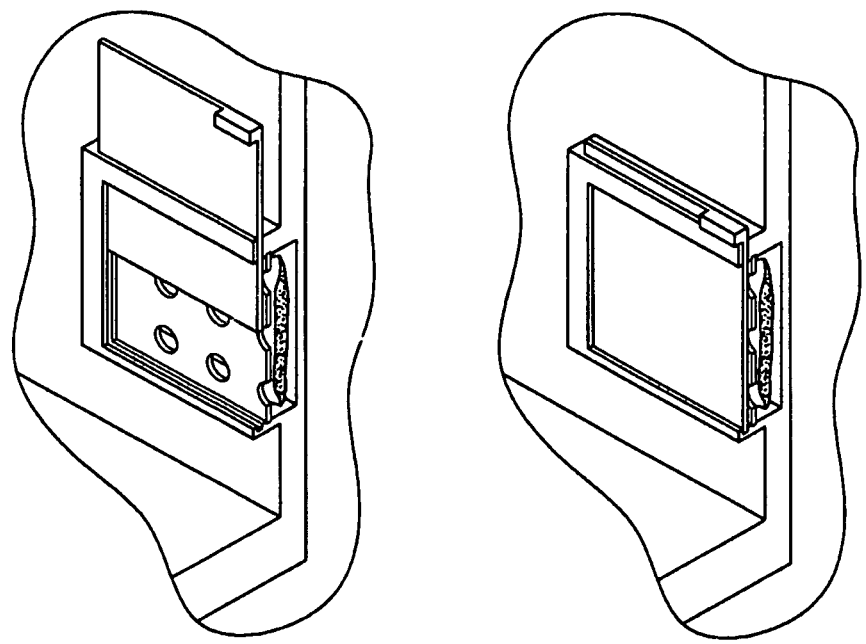
FIG. 22A is a perspective view of the humidity regulating source in an active position.
FIG. 22B is a perspective view of the humidity regulating source in a passive position.

The medicine storage module may optionally maintain a storage effecting condition within the interior of the compartment (i.e., humidity, temperature, pressure, gas composition, and combinations thereof). A desiccant, salt packet or heater may be used to regulate humidity, which may be monitored by a sensor and the output of the sensor may be displayed or communicated to the user. A desiccant disk or packet that adjustably regulates humidity may be removably engaged with the compartment to treat humidity within the compartment. The disk may be placed directly inside the storage compartment 40 or at another location within the module, with apertures in the compartment allowing the disk to effectively regulate humidity (FIG. 22-22B). Alternatively, a powered unit may employ a heater that is capable of blowing heated air into the compartment, thereby regulating the temperature and humidity of the compartment. As with the components of the lock feature, any mechanical or electrical components that power such a heater may be housed in the upper bin 42 area of a larger module version. Similarly, the area is appropriately vented and insulated. In an effort to provide the overall appliance with even greater energy efficiency, the components for the lock feature and the heater may be contained in a region outside of the appliance interior or module. This would minimize any associated heat transfer to the refrigerator section. In such an embodiment, a utility conduit, tubes, pipes, hoses, or any other vessel structure would transport the necessary fluids or gases desired for operability.

The storage compartment 40 may also include sections or dividers for medicine organization. The dividers may be removable, thereby providing the user with storage flexibility. In addition to medicine, the module may store and maintain other items, such as breast milk, formula and children's food products. Furthermore, the module compartment may be illuminated independently of the refrigerator section to enhance visibility of the medicine bottles stored in the storage compartment 40. The user interface 72 or a switch allows the user to illuminate the compartment, as needed.

The module also may contain a power failure alarm, so that a break in the storage effecting condition caused by a power surge or a power failure results in notification to the user that medicine safety may be compromised. The notification may come in the form of an audio or visual alert and may show to the user the approximate time the appliance was without power. Similarly, an alarm may be timed programmed to serve as a reminder to a user that a schedule dosage time has been reached. As with the power failure alarm, the notification may be provided in the form of an audio or visual alert. A battery within the module may allow the continued use of such a reminder feature, even in cases where the portability of the module is employed and the user removes the module from the appliance, countertop stand, or wall bracket. This would allow the module to accompany a user's trip outside of the ordinarily used environment.

The present invention further provides a method for a user to store medicine. When in use, a user may store medicine within a module according to an embodiment of the present invention with an appliance, typically a refrigerator door interior, a wall mounted bracket, or a countertop stand as described earlier. As discussed previously, at different times, the module may be engaged with connectors on both the module and the wall bracket, countertop stand, or the appliance such that at least electrical power is supplied to the module. Prior to or after the module is engaged with the appliance or other device, the compartment(s) of the modules are filled with medicine containers and engage with the bottom portion of the module. Access to the storage compartment 40 is obtained by opening a hinged or sliding compartment door 44. As discussed previously, the compartment door 44 may have a lock that restricts access to the storage compartment 40. The user may alter the lock settings through the user interface 72, which may be a computer-controlled interface or a manually-controlled interface. The method of storing the medicine may be enhanced by maintaining a storage effecting condition within the interior of the container. This step involves regulating humidity, temperature, pressure, and/or gas composition, either singularly or in combination. It should be noted that the disclosed method steps may be performed in various orders, not limited to the order presented here unless specifically so indicated.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An appliance comprising:
a rear wall section, a first side wall section, a second side wall section, a top, a bottom, and at least one appliance door, and having an interior;
a refrigerator section being within the appliance interior and having the same or a smaller volume than the interior of the appliance wherein the appliance door has an exterior surface and an interior surface having a door liner and wherein the appliance door closes to create an insulated area, and wherein the interior surface of the appliance door further comprises a module engaging connector; and
a module removably engaged with the appliance door comprising:
an insulated compartment within the module;
an insulated compartment door;
a lock for the insulated compartment door;
a utility connector that engages the appliance door and operably engages the module engaging connector of the appliance door upon movement of the module into engagement with the appliance door such that the module receives at least electrical power from the appliance when the utility connector of the module and the module engaging connector of the appliance are operably connected to one another.

2. The appliance of claim 1, wherein the appliance further comprises a computer control system operatively connected to the module and a sensor within the compartment, wherein the computer control system comprises a processor and a memory subsystem coupled to the processor where the memory subsystem stores code that, when executed based upon input received from the user, regulates the temperature and humidity of the compartment.

3. The appliance of claim 1, wherein the appliance door further comprises a cavity within the interior surface and wherein the module is sized to fit within the cavity.

4. The appliance of claim 1, wherein the module is capable of maintaining a storage effecting condition within the insulated compartment of the module, wherein the storage effecting condition is chosen from the group consisting of humidity, temperature, pressure, gas composition, and combinations thereof, and wherein temperature of the compartment is independently controlled and humidity of the insulated compartment is independently maintained by a humidity controller selected from the group consisting of a desiccant, a salt packet, and a heater.

5. The appliance of claim 1, wherein the door liner further comprises a cavity having an opening, and wherein the module engaging connector is disposed within the cavity, the refrigerator door further comprising a cover movably connected to the liner to cover the opening when the module is disengaged from the appliance door.

6. The appliance of claim 1, wherein the module includes a machine compartment for hardware and electrical components, and wherein the machine compartment is vented and insulated to prevent its operation from substantially affecting the temperatures of the refrigerator section of the appliance.

7. The appliance of claim 1, wherein the lock comprises a lock chosen from the group consisting of a mechanical lock and electrical lock, and wherein the lock may be opened using an opening device selecting from the group consisting of a key, a coded push button system, and a biometric reader.

8. The appliance of claim 1, wherein the module further comprises a power failure alarm operably connected with the electrical power from the appliance such that a break in the storage effecting condition caused by a power surge or failure results in notification to the user that medicine safety may be compromised.

9. The appliance of claim 1, wherein the appliance is capable of engaging a plurality of modules and wherein the module is capable of comprising a plurality of compartments for storing medicine, and wherein the module further comprises an illuminating device that operates independently from the appliance.

10. A portable medicine storage module comprising:
a rear wall section defining interior and exterior sides, a first side wall section, and a second side wall section, a top, and a bottom, defining an interior;
an insulated compartment within the module interior and having the same or a smaller volume than the interior;
a door movable between an opened and closed position, wherein an opened position provides a user accessibility to the compartment and a closed position creates the insulated compartment;
a lock for the door;
a releasable utility connector for powering the module, the utility connector comprising one of a male and a female electrical connector disposed on the exterior side of the rear wall section and having engagability to the other of a male and a female electrical connector of a power source, wherein the module is supplied at least electrical power from the power source when the utility connector and the power source are operably connected to one another;
at least one atmospheric controlling device, wherein the module is capable of independently maintaining a storage effecting condition within the insulated compartment, wherein the storage effecting condition is chosen from the group consisting of humidity, temperature, pressure, gas composition, and combinations thereof; and
at least one bin or divider within the insulated compartment for medicine organization; and wherein:
the module is designed and configured to be removably engaged with a door of a refrigerator.

11. The portable medicine storage module of claim 10, wherein the module further comprises a computer control system outside of the insulated compartment and within the module, and a sensor within the insulated compartment, wherein the computer control system comprises a processor and a memory subsystem coupled to the processor where the memory subsystem stores code that, when executed based upon input received from the user, regulates the temperature and humidity of the insulated compartment.

12. The portable medicine storage module of claim 10, wherein the humidity of the compartment is independently maintained by a humidity controller selected from the group consisting of a desiccant, a salt packet, or a heater.

13. The portable medicine storage module of claim 10, wherein the module is capable of maintaining a storage effecting condition within the compartment, wherein the storage effecting condition is chosen from the group consisting of humidity, temperature, pressure, gas composition, and combinations thereof, and wherein temperature of the compartment is independently controlled and wherein the humidity of the compartment is independently maintained by a humidity controller selected from the group consisting of a desiccant, a salt packet, and a heater.

14. The portable medicine storage module of claim 10, wherein the module is engageable with a surface, wherein the surface is a countertop stand, wall mount bracket, an exterior surface of an appliance door, or an interior surface of an appliance door, and wherein the module is capable of illumination independent of that of the surrounding environment.

15. A portable medicine storage module comprising:
a rear wall section defining interior and exterior sides, a first side wall section, and a second side wall section, a top, and a bottom, defining an interior;
an insulated compartment within the module interior and having the same or a smaller volume than the interior;
a door movable between an opened and closed position, wherein an opened position provides a user accessibility to the compartment and a closed position creates the insulated compartment;
a lock for the door;
a releasable utility connector for powering the module, the utility connector comprising one of a male and a female electrical connector disposed on the exterior side of the rear wall section and having engagability to the other of a male and a female electrical connector of a power source, wherein the module is supplied at least electrical power from the power source when the utility connector and the power source are operably connected to one another;
at least one atmospheric controlling device, wherein the module is capable of independently maintaining a storage effecting condition within the insulated compartment, wherein the storage effecting condition is chosen from the group consisting of humidity, temperature, pressure, gas composition, and combinations thereof; and
at least one bin or divider within the insulated compartment for medicine organization; and wherein:
the module defines a vertical axis and a horizontal axis, and the module further comprises at least one of a male electrical connector and a female connector configured to engage and electrically interconnect with the other of a male electrical connector and a female electrical connector upon downward movement of the module parallel to the vertical axis.

16. The portable medicine storage module of claim 15, wherein the lock is mechanical or electrical, and wherein the lock may be opened by selecting from the group consisting of a key, a coded push button system, and a biometric reader.

17. The portable medicine storage module of claim 15, wherein the module contains a power failure alarm, such that a break in the storage effecting condition caused by a power surge or failure results in notification to the user that medicine safety may be compromised.

18. An appliance comprising:
a rear wall section, a first side wall section, a second side wall section, a top, a bottom, and at least one appliance door, and having an interior;
a refrigerator section being within the appliance interior and having the same or a smaller volume than the interior of the appliance wherein the door has an exterior surface and an interior surface having a door liner and wherein the door closes to create an insulated area, the door liner including a generally vertical surface and a port area comprising a cavity having an opening that opens sidewardly through the generally vertical surface, the cavity having an upwardly-facing lower side, the door including a first electrical connector disposed on the lower side; and
a module removably engaged with the appliance door comprising:
an insulated compartment within the module;
an insulated compartment door;
a lock for the insulated compartment door;
at least one atmospheric controlling device, wherein the module is capable of maintaining a storage effecting condition within the compartment and the storage effecting condition comprises a storage effecting condition chosen from the group consisting of humidity, temperature, pressure, gas composition, and combinations thereof and wherein:
the module includes a horizontally extending connecting structure received in the cavity of the port area, the horizontally extending connecting structure having a second electrical connector that engages the first electrical connector upon downward movement of the connecting structure within the cavity of the port area, whereby the module is electrically connected to the appliance door and receives electrical power from the appliance door when the module is engaged with the appliance door, but not when the module is disengaged from the appliance door.

19. The appliance of claim 18, wherein the appliance door further comprises a port cover pivotably mounted to the door for movement between open and closed positions, the port cover selectively closing off the opening to the cavity when the port cover is in the closed position, and wherein the port cover is biased towards the closed position.

20. The appliance of claim 19, wherein the appliance door includes a cavity, and wherein the module is sized to fit within the cavity, and wherein the module includes an illumination device capable of independently illuminating the module compartment.

* * * * *